United States Patent [19]
Gadessaud et al.

[11] 3,917,769
[45] Nov. 4, 1975

[54] PROCESS FOR THE PREPARATION OF ELECTRODES FOR AN ELECTROCHEMICAL GENERATOR

[75] Inventors: Robert Gadessaud, Massy; Claudette Audry, Issy Les Moulineaux, both of France

[73] Assignee: Compagnie Generale D'Electricite, Paris, France

[22] Filed: Nov. 5, 1973

[21] Appl. No.: 413,141

[30] Foreign Application Priority Data
Nov. 3, 1972 France .............. 72.38945
Mar. 19, 1973 France .............. 73.09729
Aug. 31, 1973 France .............. 73.31516

[52] U.S. Cl. .............. 264/28; 136/24; 136/67; 264/104; 264/272
[51] Int. Cl.² .............. H01M 4/88
[58] Field of Search ........ 264/104, 28, 272; 136/24, 136/67

[56] References Cited
UNITED STATES PATENTS
3,024,296 3/1962 Adler .............................. 136/24

*Primary Examiner*—Jeffery R. Thurlow
*Attorney, Agent, or Firm*—Sughrue, Rothwell, Mion, Zinn & Macpeak

[57] ABSTRACT

A process for the preparation of electrodes for an electrochemical generator consisting in preparing an aqueous solution of partially reticulated polyvinyl alcohol (PVA) and in adding zinc acetate thereto, in pouring the solution into a mold in which at least one collecting grid has been previously arranged, in cooling the solution and removing from the mold the resulting cake which is immersed in potassium, in washing, drying and compressing this cake which is then coated with said aqueous PVA solution.

15 Claims, 3 Drawing Figures

PROCESS FOR THE PREPARATION OF ELECTRODES FOR AN ELECTROCHEMICAL GENERATOR

BACKGROUND OF THE INVENTION

1. Field of the Invention

The present invention relates to a process for the preparation of electrodes for an electrochemical generator, more particularly zinc, cadmium and nickel electrodes.

2. Description of the Prior Art

Of the various substances suitable for use in a reversible electrochemical couple, it is possible to cite cadmium, nickel and, in particular, zinc, which is especially important owing to its high energy capacity and its low cost.

However, in the case of a zinc electrode, in particular, a twofold disadvantage becomes apparent during the recharging thereof.

A first disadvantage results from the settling of active material due to the formation during discharging of complex soluble anions which accumulate by gravity at the bottom of the battery. During recharging, it will be noted that a deposit tends to be formed at the lower part of the electrode and hydrogen is released at the upper part. During cycling, the zinc therefore accumulates at the lower part to the detriment of the upper part which leads to a reduction of the active surface and the appearance of stresses.

A second disadvantage results from the formation of dendrites which, by mechanical action, lead to perforation of the separator and short-circuiting of the element.

Another disadvantage results from the fact that after electrodes of this nature have operated for a certain period of time in an electrolyte such as an aqueous solution of potassium, there is a certain amount of diffusion of zinc ions on the plate, in particular, which produces a fairly considerable risk of short-circuiting.

Furthermore, electrodes of this nature are generally completely immersed in the electrolyte and quite an accumulation of the zinc ions is produced at the junction between the connection bringing the current collecting grid into communication with the outside and the electrode itself, thereby further increasing the likelihood of a short-circuit.

Furthermore, it has been found that in certain cases swellings appear on the walls of the electrode. This phenomenon results from the releasing of hydrogen. After a certain amount of time this may adversely affect the operation of the electrode.

To obviate these disadvantages it has been proposed to produce electrodes consisting of zinc particles interconnected by means of polymers such as polytetrafluoroethylene or polyvinyl alcohol, only small quantities of these materials being used.

It has also been proposed to use separators based on polyvinyl alcohol in generators implementing zinc electrodes. However, even if solutions of this nature may in certain cases attenuate the disadvantages produced by the formation of dendrites, it is not possible to efficiently combat the accumulation of zinc at the lower part of the electrode or the disadvantages mentioned above and the resulting malfunctions of the generator.

SUMMARY OF THE INVENTION

The present invention is designed to obviate the above disadvantages. It relates to a process for obtaining zinc, cadmium or nickel electrodes having excellent stability even after repeated charging and discharging cycles of the generator in which they are incorporated. This process is intended to be extremely simple and suitable for use on an industrial scale.

The present invention also relates to an electrochemical generator implementing the electrodes obtained according to the process of the invention.

The invention thus relates to a method of preparing electrodes for an electrochemical generator. These electrodes comprise a collecting part consisting of an electrically conductive and chemically inert material embedded in an electrochemically active material comprising a metal or a compound of this metal and a partially reticulated polymer. This process consists in: firstly preparing a substantially saturated solution of the polymer in water and adding an element providing an aldehyde in a sufficient quantity to partially reticulate the polymer in the presence of at least one catalyst — to the extent of 5 – 20%. This process is characterized in that it comprises the following steps: to the aqueous solution of the polymer is added a salt of the metal consisting of 20 – 50 parts by weight. This salt is both soluble in water and compatible with the polymer. It is added at a temperature of between 50° and 100°C. This solution is poured into a mold in which the collecting part of the electrode has been previously arranged, until this collecting part is completely immersed. The mold is then cooled to a temperature which is at most equal to −20°C. The cake which has formed in the mold is removed therefrom and immersed in an alkaline solution saturated with an oxide of the metal. The cake is washed in cold water. It is dried at a temperature of between 20° and 60°C. The cake is then compressed at a pressure of 2–10 bars/cm$^2$.

A method of producing a zinc electrode according to the invention for use in a generator in which the electrolyte consists of an aqueous solution of potassium will now be described with reference to the accompanying drawings, by way of a purely illustrative and non-limitative example.

DESCRIPTION OF THE PREFERRED EMBODIMENTS

According to the invention, 10 grams of polyvinyl alcohol, which will be designated henceforth by the letters PVA, are introduced cold into about 200 cc water.

One gram of dimethylol urea, 0.5 gr. ammonium chloride, and 0.3 gr. sodium sulfate are incorporated in the solution thus obtained.

A zinc salt which is very soluble in water and compatible with PVA is then added to the solution under constant stirring. The zinc salt in question is zinc acetate $(CH_3CO_2)_2Zn, 2H_2O$ which is added in a quantity of about 340 gr. at a temperature of about 70°. 3 gr. of mercuric acetate may also be added to increase the over-voltage. A viscous liquid is thereby obtained which is poured into a mold in which at least one collecting grid consisting of, for example, expanded, silvered copper, has been previously arranged. The viscous liquid is poured into the mold until the entire grid has been immersed in the liquid.

The mold is then cooled rapidly to about −20°C so as to produce very small zinc acetate crystals.

The cake thus obtained is then immersed in a solution of potassium having a concentration of 8 − 12 N saturated in zinc oxide ZnO for about 24 hrs. At the end of this operation, the potassium diffuses into the mass of the cake and transforms the zinc acetate into oxide while coprecipitating PVA.

At the end of this process, the cake is washed lavishly in water so as to remove the residual potassium, and then dried in an oven at about 40°C. At the end of this drying operation, the resulting product is kept, gently gripped between two grids so as to facilitate the elimination of water and to prevent any deformation or breakage owing to thermal stressing.

The final stage of the process consists in compressing the cake at a pressure of about 5bars/cm$^2$ so as to produce the electrode which will then be subjected to a forming treatment in a known manner.

Figure 1:
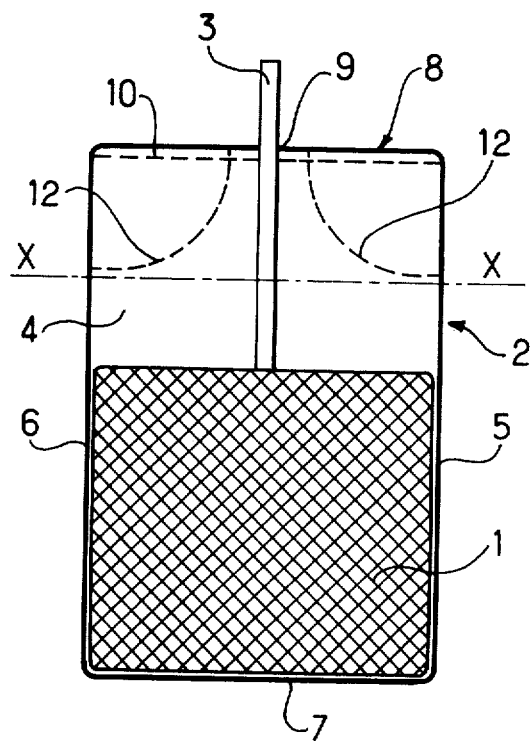
FIG. 1 represents an elevational view of a first embodiment of an electrode produced by the process according to the invention.

FIG. 1 shows a first embodiment of an electrode produced according to the invention.

As this figure shows, the electrode comprises a collecting grid 1 disposed in the middle of a mass 2 of zinc oxide and PVA precipitated by the potassium. The grid is connected to a connection 3 which discharges to the outside the electrons produced by the reaction process.

In the case of this first embodiment, the part 4 of the electrode not facing the grid 1 and the plates 5, 6 and 7 are coated, preferably by painting, with a PVA solution reticulated in a substantially similar manner to that used to produce the electrode itself. It should be noted that during this operation, the upper plate 8 of the electrode is not coated with PVA to allow the releasing of hydrogen during operation of the electrode. This avoids the formation and diffusion of zinc ions on the plates of the electrode and the disadvantages described above. When the electrode is being used, the upper plate 8 is obviously totally not immersed in the electrolyte so as to avoid the accumulation of zinc ions at the junction point between the connection 3 and the electrode itself. In the embodiment represented in this figure, the level of the electrolyte is represented by the line XX. The reticulated PVA solution is then dried by any suitable means to produce a sealed film at the deposition points.

All the plates of the electrode can obviously be coated with PVA as long as the deposit on the plate disposed above the level XX of the electrolyte is removed after drying of the PVA solution. To effect this, the upper end of the electrode may be cut along the line 10 or even along the lines 12 by means of scissors.

Electrodes produced in this manner comprise good mechanical and electrical properties which means that the electrochemical generators in which they are incorporated will also comprise excellent operating qualities.

Figure 2:
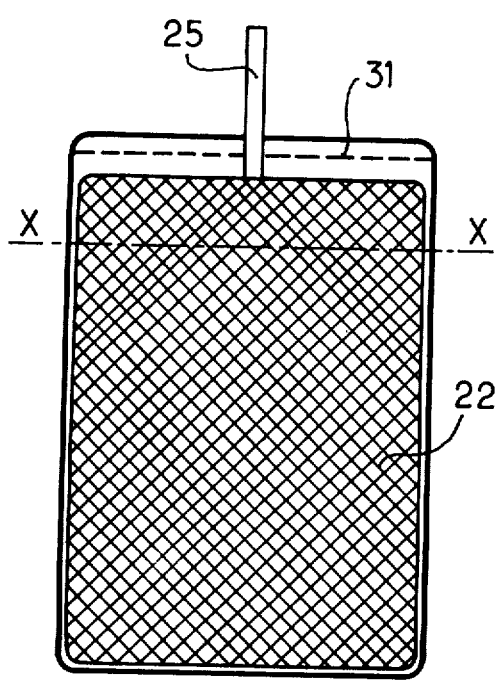
FIG. 2 represents an elevational view of another embodiment of an electrode produced by the process according to the invention.
Figure 3:
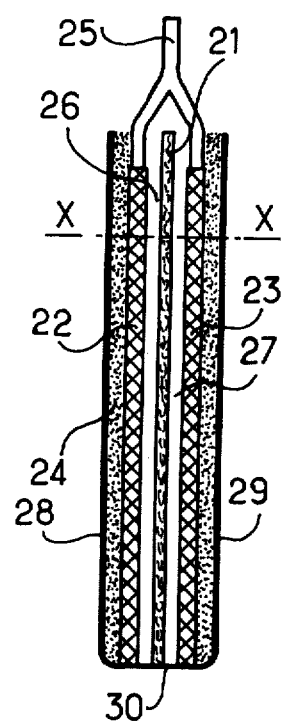
FIG. 3 is a sectional side view of FIG. 2.

FIGS. 2 and 3 represent another electrode which comprises at its center a sheet 21 made of polytetrafluoroethylene. On either side of the sheet 21 are disposed two collecting grids 22 and 23 and the entire assembly is immersed in a mass 24 of zinc oxide and PVA particles precipitated by the potassium. The grids 22 and 23 are connected to a connection 25 discharging to the outside the electrons produced by the reaction process.

It will be noted that, owing to the reciprocal non-adhesive properties of the sheet 21 on the mass 24, spaces 26 and 27 are located on either side of the sheet 21.

The faces and the plates of the electrode are coated, preferably by painting, with a PVA solution wherein the PVA is reticulated in a substantially similar manner to the solution used to produce the electrode itself. Sealed layers such as 28, 29 and 30 are thus produced.

After drying, the deposit on the upper plate of the element is removed by cutting the upper end along the line 31, represented by the perforated line, simply by means of scissors.

As mentioned above, when the electrode is in use, the upper plate is obviously not totally immersed in the electrolyte to prevent the accumulation of zinc ions at the junction point between the connection 3 and the electrode itself. In the embodiment illustrated by FIGS. 2 and 3, the level of the electrolyte is represented by the line XX.

Electrodes produced in this way have excellent electrical and mechanical properties which means that the electrochemical generators in which they are incorporated also comprise excellent operating properties.

These advantages result, in particular, from the fact that the hydrogen produced during the electrochemical process uses the spaces 26 and 27 for its release into the atmosphere by way of the upper plate of the electrode which is cut as described above, thereby avoiding any accumulation or swelling inside the electrode.

The preceding description has related to a process for preparing a zinc electrode using zinc acetate for this purpose. The zinc acetate can obviously be replaced by another salt as long as this salt is extremely soluble in water and compatible with PVA.

By way of a non-limitative example, it is possible to use halogens (in particular, zinc chloride), nitrate or chlorate.

The same applies in the production of nickel and cadmium electrodes: the acetate of these metals may advantageously be used for this purpose.

It should be noted that in each case, the structure of the electrode is in the form of very small metal particles coated with a thin film of PVA which entirely coats these particles, thereby preventing them from migrating to the lower part, while simultaneously providing an obstacle to the zinc ions.

As a result, the electrodes produced in this way have excellent electrical and mechanical properties which means that the electrochemical generators in which they are incorporated also have improved operating properties.

The process according to the invention can very easily be rendered automatic and suitable for use on an industrial scale.

The present invention is obviously not limited to the embodiments described and represented by way of example only. Without departing from the scope of the invention, various details may be modified, certain compositions may be changed and certain means may be replaced by equivalent means.

What is claimed is:

1. A process for the preparation of electrodes for electrochemical generators, said electrodes comprising a collecting part consisting of an electrochemically conductive and chemically inert material partially coated with electrochemically active material comprising a metal or a compound of said metal and a partially reticulated polymer, said polymer being soluble in water, said process comprising preparing a substantially saturated solution of said polymer in water, to which is added an organic compound providing an aldehyde in a sufficient quantity to partially reticulate said polymer in the presence of at least one catalyst to the extent of 5-20%,
- adding to the aqueous solution of said polymer a salt of said metal in a quantity of 20–50 parts by weight per part of polymer, said salt being soluble in water and compatible with the polymer and being added at a temperature of 50°–100°C,
- pouring the solution into a mold in which said collecting part of the electrode has been previously arranged, until said part is completely immersed,
- cooling the mold to a temperature at maximum equal to −20°C to form a cake, through which diffusion can occur, of said solution in which said collecting part is immersed,
- removing from the mold the cake which has been formed therein and immersing it in an alkaline solution saturated with an oxide of said metal,
- washing said cake in cold water,
- drying the cake at a temperature of 20°–60°C, and
- compressing the cake at a pressure of between 2 and 10bars/cm$^2$.

2. A process according to claim 1, characterized in that said metal is selected from the group consisting of zinc, cadmium and nickel.

3. A process according to claim 2, characterized in that the salt of said metal is selected from the group consisting of halogen, acetate, nitrate, and chlorate.

4. A process according to claim 1, characterized in that said polymer is polyvinyl alcohol.

5. A process according to claim 1, characterized in that said organic compound providing an aldehyde in sufficient quantity to partially reticulate the polymer is dimethylol urea.

6. A process according to claim 1, characterized in that 1–3% by weight mercuric acetate relative to the weight of the metal constituting the electrochemically active part of the electrode is added to the solution in the second step of the process.

7. A process according to claim 1 characterized in that the electrode produced by compressing said cake is coated with the partially reticulated polymer solution prepared in the first step, this coating process being effected on the parts of the lateral surfaces not facing the collecting part of the electrode and on at least the lateral plates and the lower plates of the electrode.

8. A process according to claim 7, characterized in that; said plates of the electrode are first coated and then at least one of the plates is cut so that the electrochemically active part of the electrode is in contact with the ambient atmosphere.

9. A process according to claim 8, characterized in that the upper plate of the electrode is cut.

10. A process according to claim 8, characterized in that the upper plate and a part of the lateral plates of the electrode are cut.

11. A process according to claim 1, characterized in that the electrode produced by the compression of the cake is coated with a solution of partially reticulated polymer prepared in the first step of the process, the coating being carried out over the entirety of the lateral faces and the plates of the electrode and in that said collecting part of the electrode surrounds a sheet made of a material having non-adhesive properties with respect to the electrochemically active part of the electrode so that at least a space is provided between said electrochemically active part and said sheet.

12. A process according to claim 11, characterized in that said collecting part comprises two grids disposed on either side of said sheet, said electrochemically active part impregnating at least partially said grids.

13. A process according to claim 11, characterized in that said sheet comprises polytetrafluoroethylene.

14. A process according to claim 11, characterized in that said sheet comprises polydichlorodifluoroethylene.

15. A process according to claim 11, characterized in that the upper plate of the electrode is cut parallel to its peak.

* * * * *